United States Patent [19]
Dell

[11] Patent Number: 6,141,726
[45] Date of Patent: Oct. 31, 2000

[54] METHOD FOR MODIFYING DATA

[75] Inventor: Jörg Dell, Ludwigsburg, Germany

[73] Assignee: Robert Bosch GmbH, Stuttgart, Germany

[21] Appl. No.: 09/139,951

[22] Filed: Aug. 25, 1998

[30] Foreign Application Priority Data

Aug. 26, 1997 [DE] Germany ............................ 197 37 182

[51] Int. Cl.$^7$ .................................................. G06F 12/00
[52] U.S. Cl. ............................ 711/103; 711/202; 711/165
[58] Field of Search .................................... 711/202, 165, 711/221, 141, 103; 395/712; 714/710; 707/100; 386/70

[56] References Cited

U.S. PATENT DOCUMENTS

| | | | |
|---|---|---|---|
| 5,719,983 | 2/1998 | Henderson et al. | 386/70 |
| 5,893,152 | 4/1999 | Fuller et al. | 711/141 |
| 5,991,902 | 11/1999 | Yoshida | 714/710 |
| 5,999,933 | 12/1999 | Mehta | 707/100 |

FOREIGN PATENT DOCUMENTS 195 00 453
A1 12/1995 Germany .

*Primary Examiner*—John W. Cabeca
*Assistant Examiner*—Brian R. Peugh
*Attorney, Agent, or Firm*—Kenyon & Kenyon

[57] ABSTRACT

A method for modifying data to be used by a program of a data processing system, in particular a controller for controlling an assembly. The data is stored in a first memory in the form of reference data. The memory addresses of the reference data in the first memory are stored in a reference data memory address table in the first memory so that they can be accessed by the program. According to this method, the reference data memory address table is copied to a second memory in the form of a working data memory address table to be addressed by the program, and the reference data to be modified is copied to the second memory in the form of working data to be modified. Further, the working data memory address table is modified so that the memory addresses of the working data to be modified in the second memory replace the memory addresses of the reference data to be modified in the first memory, after which the working data is modified.

13 Claims, 5 Drawing Sheets

METHOD FOR MODIFYING DATA

FIELD OF THE INVENTION

The present invention relates to a method for modifying data to be used by a program of a data processing system, in particular, a controller for controlling an assembly.

BACKGROUND INFORMATION

A method for optimizing data and/or program sections for programmable controllers, in particular, engine control gear, is known from German Published Patent Application No. 195 00 453 A1. The data stored in the controller is optimized so that the controller will meet certain requirements, such as minimal fuel consumption and low emissions, taking into account enhanced comfort features such as running smoothness.

Generally speaking, the modification of this data (fixed values, characteristics, operating maps) is referred to as an "application". An application can be subdivided into serial and parallel applications. In the case of serial applications, which is what is examined here, the data is supplied to the controller via a serial interface, while, in the case of parallel applications, the data memory is emulated, for example, by a dual-port RAM (random-access memory).

The controller is connected via a serial interface to an external application device from which the changes to the data to be optimized are entered, such data relating to, for example, operating maps for the quantity of injected fuel and injection angle. The external application device is, for example, a programmed personal computer with a keyboard and monitor.

In the known method, the data to be optimized is loaded from a programmable read-only memory (PROM) to a random-access memory (RAM) of the controller prior to optimization. An erasable EPROM in the form of a FLASH EPROM, which can be erased and programmed without requiring a separate programming device, is used as the programmable read-only memory (PROM). Nevertheless, in order to carry out a serial application or a modification of the data stored in the programmable read-only memory (PROM), it must be possible to load the complete data set applied into the available random-access memory (RAM).

If the random-access memory is not adequately dimensioned, which is usually the case, an additional emulation memory must be provided for application purposes, or applicability of some of the data will necessarily be lost. In order to apply all of the data stored in the read-only memory, the storage capacity of the random-access memory must be at least as high as the storage capacity of the read-only memory.

In all known serial application methods, the data which can be applied must be determined from the total volume of data before program execution. The size of the selected data subset always depends on the available RAM, regardless of whether this memory is built-in specifically for application purposes (i.e. "SERAM": serial application with additional memory) or whether existing memory can be used (i.e. "SERAP": serial application without additional memory). If the entire data set fits in the available memory, all data can be applied according to these methods. If, however, the available memory is insufficient, certain data which can be loaded into the available memory during program runtime, and is therefore applied, is selected before program execution.

However, none of the known methods enables any data to be applied during program execution in the case of limited memory availability, nor do they make it possible to decide which data will be loaded into RAM during program execution.

As a result, there is a disadvantage in that either an emulation memory must be provided, thereby incurring additional hardware expense, or the application flexibility must be limited.

SUMMARY OF THE INVENTION

An object of the method according to the present invention is to apply or change any volume of data stored in the first memory more or less independently of the storage capacity of the available second memory without having to provide an additional emulation memory or prevent the application of certain data. "More or less independently", as used herein, means that only the working data memory address table and the largest data structure provided for an application need fit in the second memory. The storage capacity of the second available memory is therefore limited only to the volume of data that can be applied simultaneously.

The data can be organized into any data structures, in particular as individual items of data. The data structures can be accessed quickly using stored pointer addresses or vectors in the form of a memory address table. Since an additional emulation memory need not be provided, the method according to the present invention is a very economical solution. Data is optimized especially quickly because flexible access to the data structures is provided by a dynamic memory management system.

The general idea behind the present invention is that, when data is applied, not all of the data stored in a first memory of a controller and addressable by a memory address table need be copied to the second memory of the data processing system, but only the data to be modified need to be so copied.

According to an embodiment of the present invention, the modified working data is reloaded into the first memory in the form of new reference data. This reloading operation is generally the last step in an optimization phase during which the various changes are tested.

According to another embodiment of the present invention, the data is addressed indirectly by the program using the reference data memory address table or the working data memory address table. The advantage of this is that it provides dynamic and flexible memory management.

According to a further embodiment of the present invention, the reference data memory address table and the reference data to be modified are copied following a manipulation request. In other words, the manipulation request introduces a modification phase.

According to a further embodiment of the present invention, the manipulation request is entered from an external application device connected to the data processing system.

According to a further embodiment of the present invention, the reference data is organized into data structures, preferably in the form of data pages, and stored in the first memory. The advantage of this is that a large volume of reference data can be grouped by function and applied and reloaded page by page.

According to a further embodiment of the present invention, a program code is stored in a first storage area of the first memory.

According to a further embodiment of the present invention, the program switches between access to the reference data stored in a second storage area of the first memory during program execution, using the reference data memory address table stored in a third storage area of the first memory, and access to the working data stored in a second storage area of the second memory, additionally using the working data memory address table stored in a first storage area of the second memory. Switching is suitably carried out by an offset address or an offset algorithm. In this case, only minimal changes need be made to existing program sections.

According to a further embodiment of the present invention, the working data is modified during program execution. The advantage of this is that the effects of the changes can be seen directly on-line, and the old, tried and tested reference data can be accessed again at any time.

According to a further embodiment of the present invention, the modified working data is reloaded to the first memory so that the modified working data is stored temporarily in a buffer together with the unmodified reference data. This is especially advantageous if the reference data can be programmed only page by page. In this case, a suitable buffer is selected according to the page size.

According to a further embodiment of the present invention, the buffer is a fourth storage area of the first memory.

According to a further embodiment of the present invention, the first memory is a read-only memory that can be programmed page by page or cell by cell, and the second memory is a random-access memory.

According to a further embodiment of the present invention, the first memory is a FLASH EPROM. A FLASH EPROM of this type can be erased in blocks, programmed by pages or by cells, and read out by cells.

DETAILED DESCRIPTION

Figure 1:
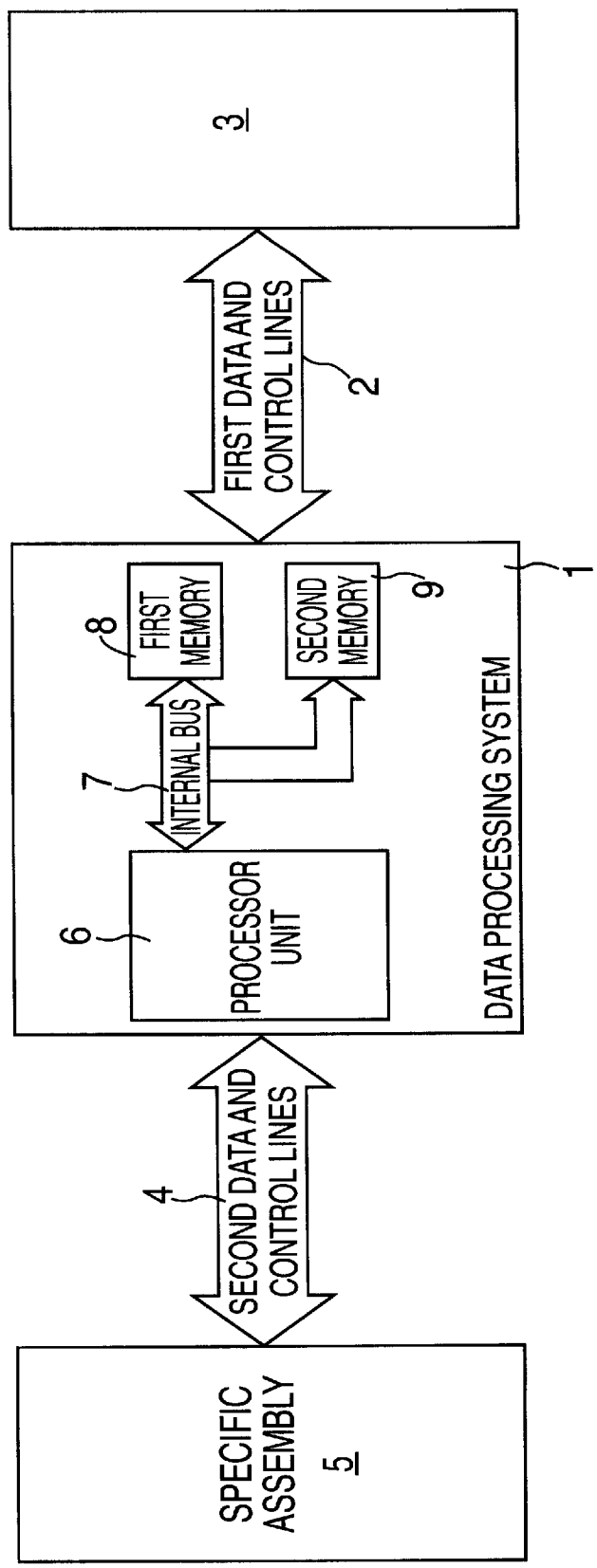
FIG. 1 shows an arrangement for applying reference data of a controller for an assembly using the method according to the present invention for modifying data.

FIG. 1 shows an arrangement for applying reference data of a controller for an assembly in accordance with the method of the present invention.

In FIG. 1, a data processing system 1 is connected on the input side to an application device 3 via first data and control lines 2 and on the output side to a specific assembly 5, such as an electronically controlled engine, via second data and control lines 4.

In this embodiment, data and control lines 2 are composed of a serial data transfer bus, with application device 3 communicating with data processing system 1 via a serial interface.

Data processing system 1 controls assembly 5 via data and control lines 4 and also detects state variables of assembly 5 such as the rpm, air flow, and temperature of the above-mentioned engine.

Data processing system 1 has a processor unit 6 which is connected to a first memory 8 and to a second memory 9 via an internal bus 7.

A suitable processor unit 6 is a microprocessor which is connected to application device 3 via the serial interface and an internal bus.

First memory 8 is a programmable read-only memory (PROM) in which data and a program code for controlling assembly 5 are stored. First memory 8 is, for example, a FLASH EPROM. The FLASH EPROM can suitably be erased in blocks and programmed by segments or pages (although it can also be programmed by cells) without requiring a separate programming unit, as is the case with conventional EPROMs.

Second memory 9 is a conventional read/write device, for example a random-access memory (RAM) or a mass storage device such as a hard disk.

Processor unit 6, first and second memories 8, 9, and the serial interface are suitably integrated on a chip, although this is not always possible.

Application device 3 is used for applying, i.e. modifying, the data stored in memory 8 of data processing system 1 in order to test the effects of this data change on the performance of assembly 5, in particular, on its state variables. Any conventional programmed personal computer with a keyboard and monitor can be used as the application device 3. An operator enters the data to be applied from the keyboard. However, the data to be applied can also be generated by an automatic application system and sent to the application device 3.

When applying data, the reference data stored in first memory 8 must be modified. The reference data may be set to an initial default or based on previous experience. When applying the reference data, the response of assembly 5 to this data change is tested and a data setting selected which produces a better result compared to the previous reference data, based on certain requirements imposed. The data is applied on-line, i.e. while the program code stored in first memory 8 is being executed. Since the reference data is stored in first memory 8, which is designed as a read-only memory, it must be temporarily transferred to second memory 9, which is designed as a random-access memory, before it can be modified.

In the method according to the present invention, it is no longer necessary to transfer all of the data from first memory 8 for test purposes.

Figure 2:
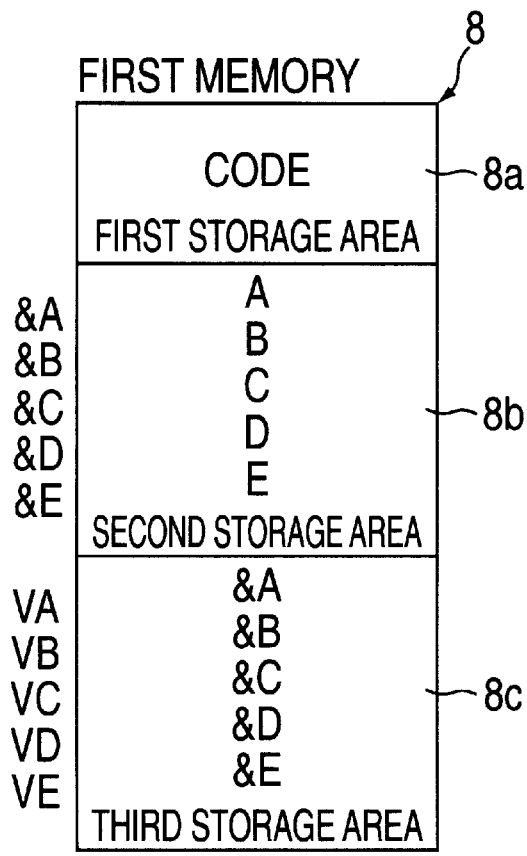
FIG. 2 shows the allocation of the first and second memories of the data processing system before carrying out the method according to the present invention for modifying data.
Figure 2:
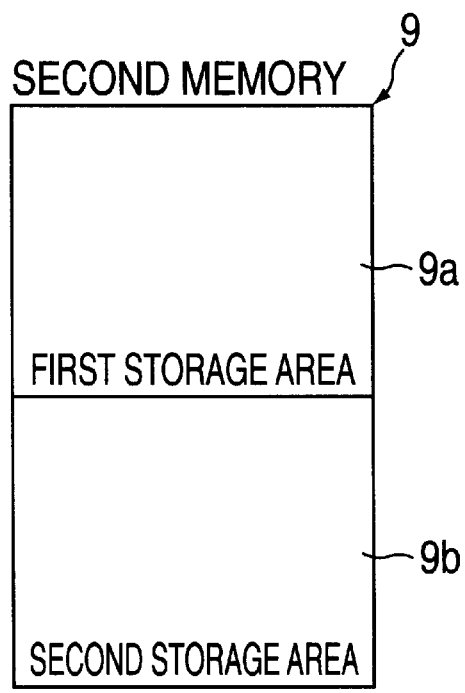

FIG. 2 shows the allocation of the first and second memories of the data processing system before carrying out the method according to the present invention for modifying data.

First memory 8 is a read-only memory, a FLASH EPROM in this case, which has a first storage area 8a in which the program code for controlling assembly 5 is stored. Reference data, organized into data structures A, B, C, D, E is stored in a second storage area 8b. Data structures A, B, C, D, E are addressable via corresponding addresses &A, &B, &C, &D, &E. Data structures A, B, C, D, E may be composed of individual items of data or of data blocks containing many individual items of data.

These data structures can be accessed indirectly by vectors in which addresses &A, &B, &C, &D, &E are stored. These vectors are stored in a reference data memory address table in a third storage area 8c of first memory 8. Vectors pointing to data structures A, B, C, D, E are stored under memory addresses VA, VB, VC, VD, VE in first memory 8. Addresses &A, &B, &C, &D, &E stored in the vectors are the start addresses of data structures A, B, C, D, E stored in first storage area 8a.

Figure 3:
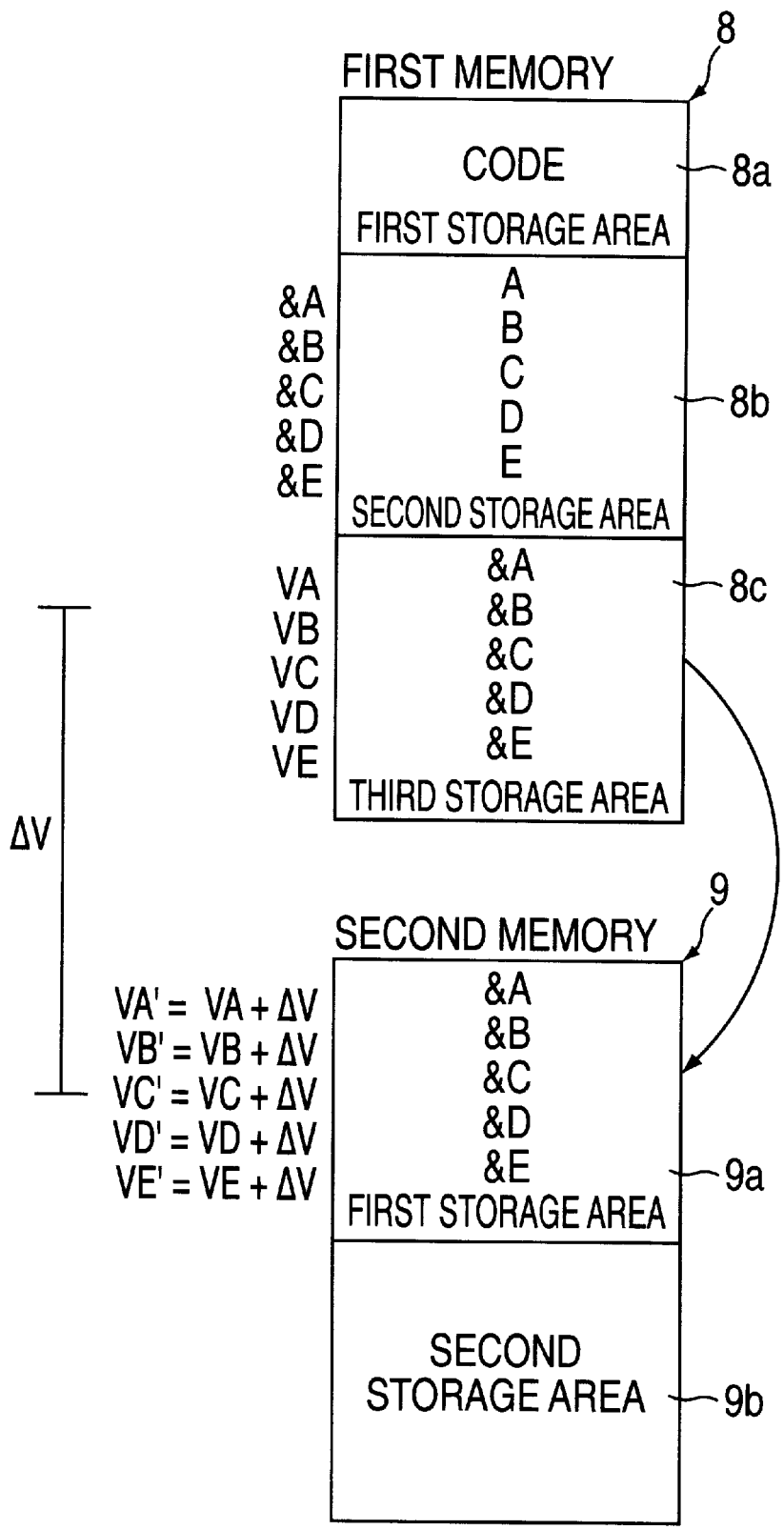
FIG. 3 shows the allocation of the first and second memories of the data processing system after the reference data memory address table is copied to the second memory.

FIG. 3 shows the allocation of the first and second memories of the data processing system after copying the reference data memory address table to the second memory.

At one or more specific points in time during program execution, e.g., while booting the computer of data processing system 1, a complete copy of the reference data memory address table is created at addresses VA', VB', VC', VD', VE' in first storage area 9a of the second memory 9. This copy step does not change the contents of the copied reference data memory address table. The copied reference data memory address table is referred to as the working data memory address table, with addresses VA', VB', VC', VD', VE' of the copied vectors varying from the addresses of original vectors VA, VB, VC, VD, VE by a difference or an offset ΔV.

Figure 4:
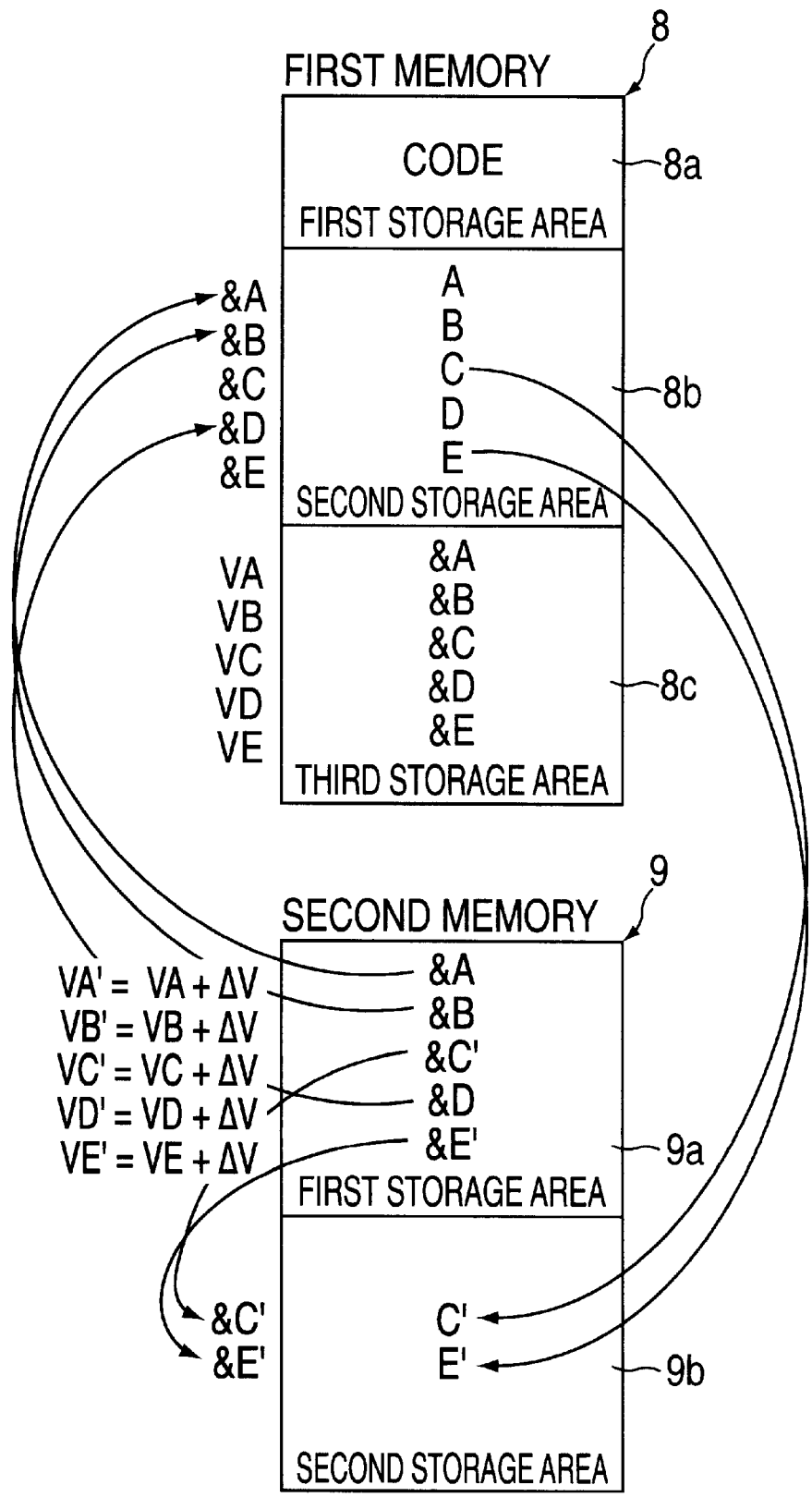
FIG. 4 shows the allocation of the first and second memories of the data processing system after the reference data to be modified is copied to the second memory in the form of working data and the working data memory address table is modified.

FIG. 4 shows the allocation of the first and second memories 8, 9 of the data processing system 1 after copying the reference data to be modified to the second memory 9 in the form of working data and after modifying the working data memory address table.

Reference data C, E to be modified from second storage area 8b of first memory 8 is copied to a second storage area 9b of second memory 9.

Certain data is modified by an input arrangement attached to application device 3 and supplied to application device 3. Application device 3 sends a manipulation request for the data or data blocks affected to data processing system 1 via data and control lines 2.

In the example shown in FIG. 4, data affecting data structures C, E are modified. Application device 3 thus sends a manipulation request for data structure C and data structure E to data processing system 1. Processor unit 6 of data processing system 1 copies only data structures C, E containing reference data at addresses &C, &E in second storage area 8b of first memory 8 to addresses &C', &E' in second storage area 9b of second memory 9 via internal bus 7. Copied data structures C', E' at addresses &C', &E' contain working data to be modified, which initially matches the reference data of data structures C, E after copying.

Vectors stored at addresses VC' and VE' in first storage area 9a of second memory 9, which initially point to data structures C, E for which a manipulation request has been made, are diverted to copied data structures C', E', i.e. pointer addresses &C, &E stored in the vectors of the working data memory address table are replaced by pointer addresses &C', &E'.

After copying data structures C, E containing the reference data to be modified from first memory 8 to second memory 9 in the form of data structures C', E' containing working data, data processing system 1 sends an acknowledgment signal to application device 3 via data and control lines 2, notifying application device 3 that the data structures containing the data to be applied have been copied to second memory 9. Application device 3 modifies the working data located in data structures C', E' in second storage area 9b of second memory 9 according to the application data entered in application device 3.

In doing this, only data structures C, E affected by the application operation are copied from first memory 8 to second memory 9, where they are overwritten by the application data. Data structures A, B, D not affected by a change are not copied and remain stored without any changes in second area 8b of first memory 8.

Therefore, the storage capacity of second memory 9 limits only the number of data structures that can be applied simultaneously. This is made possible by the fact that, with this method according to the present invention, not all data structures are copied from first memory 8 to second memory 9, but only the data structures actually affected by the data changes. A second memory 9 with a smaller storage capacity than first memory 8 still makes it possible to apply all data structures stored in first memory 8 without requiring an additional emulation memory to be provided for data application purposes.

Figure 5:
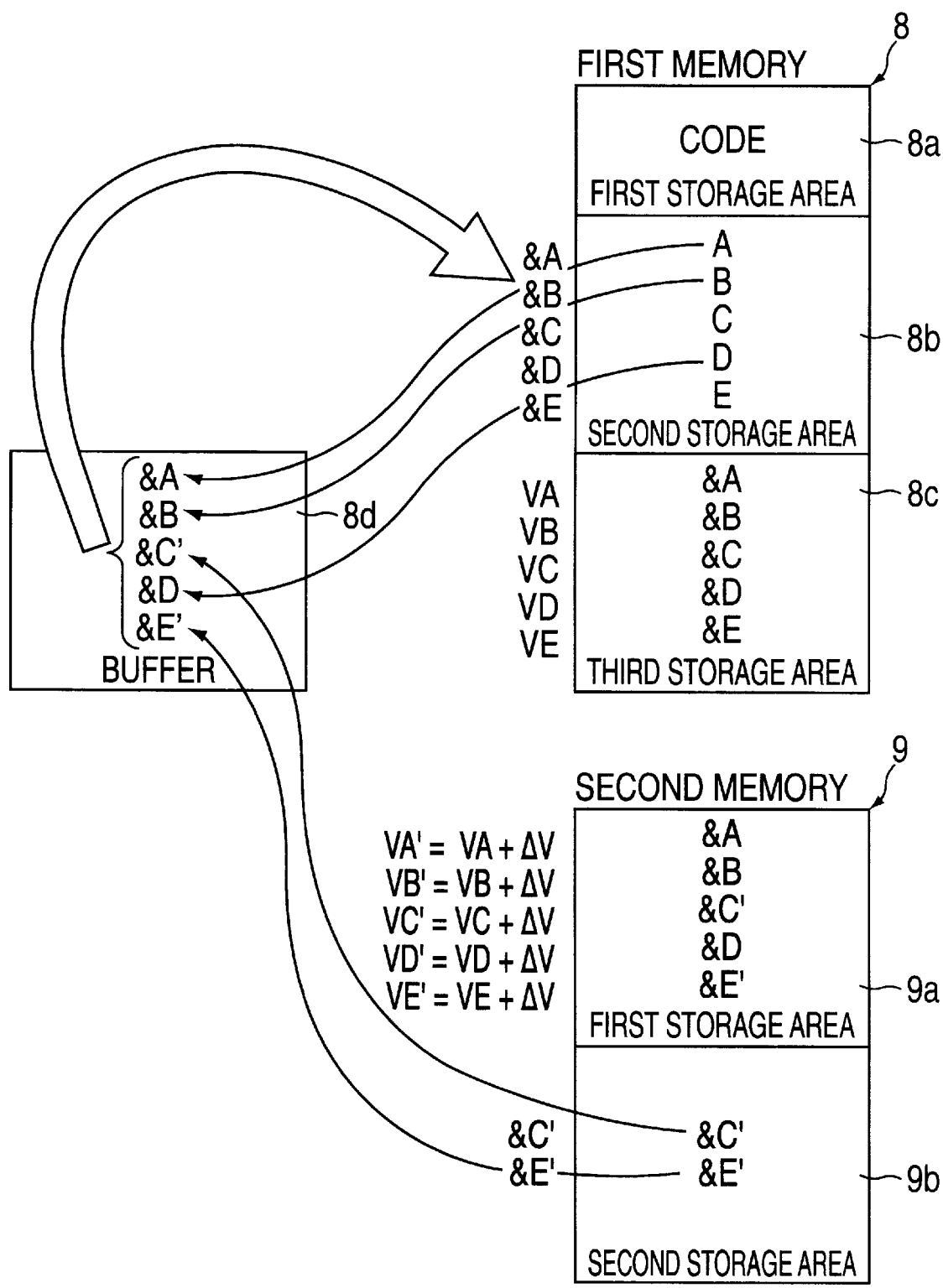
FIG. 5 shows the allocation of the first and second memories of the data processing system when the modified working data is reloaded into the first memory in the form of reference data via a buffer.

FIG. 5 shows the allocation of the first and second memories 8, 9 of the data processing system 1 when reloading the modified working data into the first memory 8 in the form of reference data via a buffer.

Data structures C', E' affected by modifying the working data during an application session are reloaded to second storage area 8b of first memory 8 in the form of new reference data via a buffer 8d. Buffer 8d is preferably a storage area of first memory 8, suitably a page in the FLASH EPROM.

However, it is also possible to reload the applied working data from second storage area 9b of second memory 9 to second storage area 8b of first memory 8 directly without using a buffer.

The reload operation replaces the existing reference data with the application data found during the application session and producing a desired response of assembly 5. This reference data can be refreshed as often as necessary by application.

The reference data can be applied while the program code is being executed in first storage area 8a of first memory 8 and while assembly 5 is being driven by the program code via data and control lines 4.

With the input operation, the program code switches between access to the data structures containing reference data stored in second storage area 8b of first memory 8 and access to the data structures containing working data stored in second storage area 9b of second memory 9. Switching between reference data and working data can be controlled from the outside and takes place via a memory base address SBA.

If during processing, for example, the program code software accesses data stored in data structure C, it takes the pointer address stored in the vector with address VC +SBA, where VC is the vector address for data structure C contained in the memory address table and SBA is the memory base address.

Memory base address SBA is set to zero if the reference data is to be accessed, while memory base address SBA is set to offset ΔV if the working data is to be accessed.

When using reference data, the program code thus accesses the vector with pointer address &C, which is stored at address VC in the reference data memory address table and points to data structure C containing the reference data in second storage area 8b of first memory 8.

When using working data, the program code accesses the vector with pointer address &C', which is stored at address VC'=VC+ΔV in the working data memory address table and points to data structure C' containing the working data in second storage area 9b of second memory 9.

Data can therefore be applied while processing the program code, with the program code being able to access the working or reference data from the outside, controlled externally by the applier. This form of dynamic memory management through indirect addressing makes it possible to access data quickly and flexibly.

Although the present invention was described above on the basis of an embodiment, it is not limited to this but can instead be modified in a variety of ways.

In particular, the method according to the present invention can be used not only for a read-only memory (PROM), but also for any other kind of memory.

In addition, switching the program code software from the first memory 8 to the second memory 9 can be implemented not only with an offset but also with any type of algorithm. For example, when using a data processing system that does not have linear addressing capabilities, but instead uses some other algorithm format, the offset algorithm need only be adapted to this format in order to access the first and second memories 8, 9 variably and without a great deal of effort.

The special interaction between the tester (application device 3) and the controller described above is not necessary either. The flow of communication depends primarily on the transfer protocol used, which has no effect on the method described in the present invention.

For example, there are protocols which dispense with the security of an acknowledgment signal entirely. It is also conceivable to have all actions described by the schematic diagram in FIG. 4 initiated by a single instruction from the tester. In addition, the tester need not usually be notified of the actions taking place in the controller, for example address changes and copy operations. He only needs to know whether or not the manipulation (data change) was completed successfully. As a result, the interface to the tester remains independent of the application method used in the controller.

What is claimed is:

1. A method for modifying data to be used by a program of a data processing system for controlling an assembly, the data being stored in a first memory as reference data associated with memory addresses in the first memory, the memory addresses in the first memory being stored in a reference data memory address table of the first memory in order to be addressed by the program, and the reference data including a portion to be modified and another portion to be left unmodified, the method comprising the steps of:

a) copying the reference data memory address table to a second memory as a working data memory address table in order to be addressed by the program;

b) copying the portion of reference data to be modified to the second memory as working data to be modified, the working data to be modified being associated with memory addresses in the second memory;

c) modifying the working data memory address table in order to replace the memory addresses of the portion of reference data to be modified in the first memory with the memory addresses of the working data to be modified in the second memory; and d) modifying the working data, wherein the working data to be modified is modified during an execution of the program.

2. The method according to claim 1, wherein the data processing system includes a controller.

3. The method according to claim 1, further comprising the step of reloading the modified working data into the first memory as new reference data.

4. The method according to claim 1, wherein the program indirectly addresses the data by using one of the reference data memory address table and the working data memory address table.

5. The method according to claim 1, wherein before step a) and step b) are performed, the method further comprises the step of entering a manipulation request.

6. The method according to claim 5, wherein the step of entering the manipulation request includes the step of entering the manipulation request from an external application device coupled to the data processing system.

7. The method according to claim 1, wherein the reference data is organized into data structures that are in the form of data pages and stored in the first memory.

8. The method according to claim 1, wherein a code of the program is stored in a first storage area of the first memory.

9. The method according to claim 8, wherein, during an execution of the method, the program switches between:

accessing the reference data stored in a second storage area of the first memory by using the reference data memory address table stored in a third storage area of the first memory, and accessing one of the working data to be modified and the modified working data stored in a second storage area of the second memory by using the working data memory address table stored in a first storage area of the second memory.

10. The method according to claim 3, wherein the step of reloading the modified working data includes the step of temporarily storing the modified working data in a buffer together with the portion of reference data left unmodified.

11. The method according to claim 10, wherein the buffer is a fourth storage area in the first memory.

12. The method according to claim 1, wherein the first memory includes a read-only memory that can be programmed on one of a page-by-page basis and a cell-by-cell basis, and wherein the second memory includes a random-access memory.

13. The method according to claim 12, wherein the first memory includes a FLASH EPROM.

* * * * *